United States Patent [19]

Mizukuki et al.

[11] Patent Number: 5,344,682
[45] Date of Patent: Sep. 6, 1994

[54] OPTICAL RECORDING MEDIUM

[75] Inventors: Tadahiko Mizukuki, Tokyo; Tadashi Koike, Kamakura; Nobuhisa Kitagawa; Sumio Hirose, both of Yokohama, all of Japan

[73] Assignee: Mitsui Toatsu Chemicals, Inc., Tokyo, Japan

[21] Appl. No.: 896,862

[22] Filed: Jun. 12, 1992

[30] Foreign Application Priority Data

Jun. 14, 1991 [JP] Japan ................. 3-142819
Jun. 14, 1991 [JP] Japan ................. 3-142858

[51] Int. Cl.$^5$ ................................. B32B 3/00
[52] U.S. Cl. ...................... 428/64; 428/65; 428/457; 428/913; 346/76 L; 346/135.1; 430/945
[58] Field of Search .......... 428/65, 457, 913; 346/76 L, 135.1; 430/945

[56] References Cited

U.S. PATENT DOCUMENTS

| 4,947,384 | 8/1990 | Suzuki | 369/279 |
| 5,075,147 | 12/1991 | Usami | 428/64 |
| 5,080,946 | 1/1992 | Takagisi | 428/64 |

FOREIGN PATENT DOCUMENTS

0381211  8/1990  European Pat. Off.

OTHER PUBLICATIONS

Patent Abstracts of Japan, vol. 14, No. 122 (P-1017) Mar. 7, 1990.
Patent Abstracts of Japan, vol. 14, No. 059 (P-1000) Feb. 2, 1990.
Patent Abstracts of Japan, vol. 9, No. 232 (P-389) (1955) Sep. 18, 1985.
Patent Abstracts of Japan, vol. 13, No. 203 (P-870) (3551) May 15, 1989.
Patent Abstracts of Japan, vol. 13, No. 428 (P-936) (3776) Sep. 25, 1989.

*Primary Examiner*—Patrick J. Ryan
*Assistant Examiner*—Elizabeth Evans
*Attorney, Agent, or Firm*—Millen, White, Zelano, & Branigan

[57] ABSTRACT

An optical recording medium of a single plate type comprises a substrate having a groove, a recording layer containing a dye overlying the substrate, a reflective layer overlying the recording layer and a protective layer overlying the reflective layer, wherein the recording layer is formed by a spin-coating method and the dimension of the groove varies from the center portion of the substrate toward the outer periphery thereof.

10 Claims, 1 Drawing Sheet

OPTICAL RECORDING MEDIUM

BACKGROUND OF THE INVENTION

1. Field of the Invention

The present invention relates to an optical recording medium, and more particularly, to an optical recording medium comprising a recording layer containing a dye, a reflective layer and a protective layer, and capable of recording a large volume of information and playable by commercially available compact disc players.

2. Description of the Related Art

As an information-oriented society has recently developed rapidly, optical recording mediums have been widely utilized and researched which can make a remarkably high density recording as compared with magnetic recording mediums.

As optical recording mediums, there are known a read-only-medium in which information has been recorded in advance and only reproduction is possible, a writable medium in which information can be recorded by users and reproduced, and a rewritable medium in which information can be recorded therein and the information thus recorded can be reproduced or erased.

Among them, the writable medium is generally inexpensive and excellent in durability as compared with the rewritable medium. Therefore, the writable medium has been widely used as a medium for storing a large volume of data.

The optically writable medium may have a metal layer of Te, Bi or the like or a dye layer of cyanine dyes, phthalocyanine dyes or the like as a recording layer on a substrate.

Information can be recorded in the recording layer by irradiating a laser beam to cause a physical or chemical change (pits formation) in the layer.

The pits are read out with a laser beam which is sufficiently weaker than that used for recording and thereby the information can be reproduced.

Among the optically writable mediums, there have recently been developed and spread some mediums capable of reading out by commercially available compact disc (CD) players.

The writable mediums which can be reproduced by CD players are proposed in Optical Data Storage 1989 Technical Digest Series Vol. 1, 45 (1989), EP-353393 and the like. The mediums are of a single plate type comprising a recording layer composed of an organic dye, a metal reflective layer and a protective layer.. However, a cyanine dye is used in the recording layer so that there are problems as to poor light resistance and poor heat and humidity resistance.

Further, EP - 0373643 discloses a writable medium comprising a recording layer composed of phthalocyanine type dye which is excellent in light resistance and humidity and heat resistance and can be reproduced by a CD player.

When an optical disc is manufactured which has a pit and a track in a rugged form, the molding shrinkage varies in the radial direction depending on a material used for forming a substrate and molding conditions. For the purpose of solving this problem, Japanese Patent Application Laid-open No. 131654/1985 proposes to brooden the width of pits in the inner area of a stamper taking the molding shrinkage into consideration.

Further, optical discs of CAV (constant angular velocity) mode such as video disc and the like have a drawback that reflection conditions upon recording differ. In order to eliminate the drawback, Japanese Patent Application Laid-open No. 282758/1989 proposes that the depth of pits at the inner area of a substrate is made deeper than that at the outer peripheral area.

In the case of the above-mentioned medium having a recording layer composed of a dye, the recording layer is usually formed by coating an organic dye solution, in particular, a spin-coating method is generally used since the film forming is easy and the method is economical.

However, when a recording layer is formed by a spin-coating method, the present inventors have found that it is very difficult to coat uniformly a recording layer on a substrate having a groove. In particular, the thickness of the recording layer on a groove and that on a land (a portion between adjacent grooves) vary from the center portion of the substrate toward the outer periphery of the substrate, and the characteristics such as reflectivity, push-pull signal, radial contrast and the like are disadvantageously non-uniform in the direction from the center portion of the substrate to the outer periphery thereof, since such characteristics depend on the thickness of the recording layer on a groove and that on a land.

The present inventors have intensively made researches for solving the above-mentioned problems. As a result, they have found that the above-mentioned characteristics largely depend on the surface shape of the recording layer and the shape of the groove and completed the present invention.

SUMMARY OF THE INVENTION

It is an object of the present invention to provide an optical recording medium having uniform characteristics over the whole surface of the medium at least partly with respect to reflectivity, radial contrast signal, and push-pull signal.

According to the present invention, there is provided an optical recording medium of a single plate type comprising a substrate having a groove, a recording layer containing a dye overlying the substrate, a reflective layer overlying the recording layer and a protective layer overlying the reflective layer, wherein the recording layer is formed by a spin-coating method and the dimension of the groove varies from the center portion of the substrate toward the outer periphery thereof.

DESCRIPTION OF THE PREFERRED EMBODIMENTS

Figure 1:
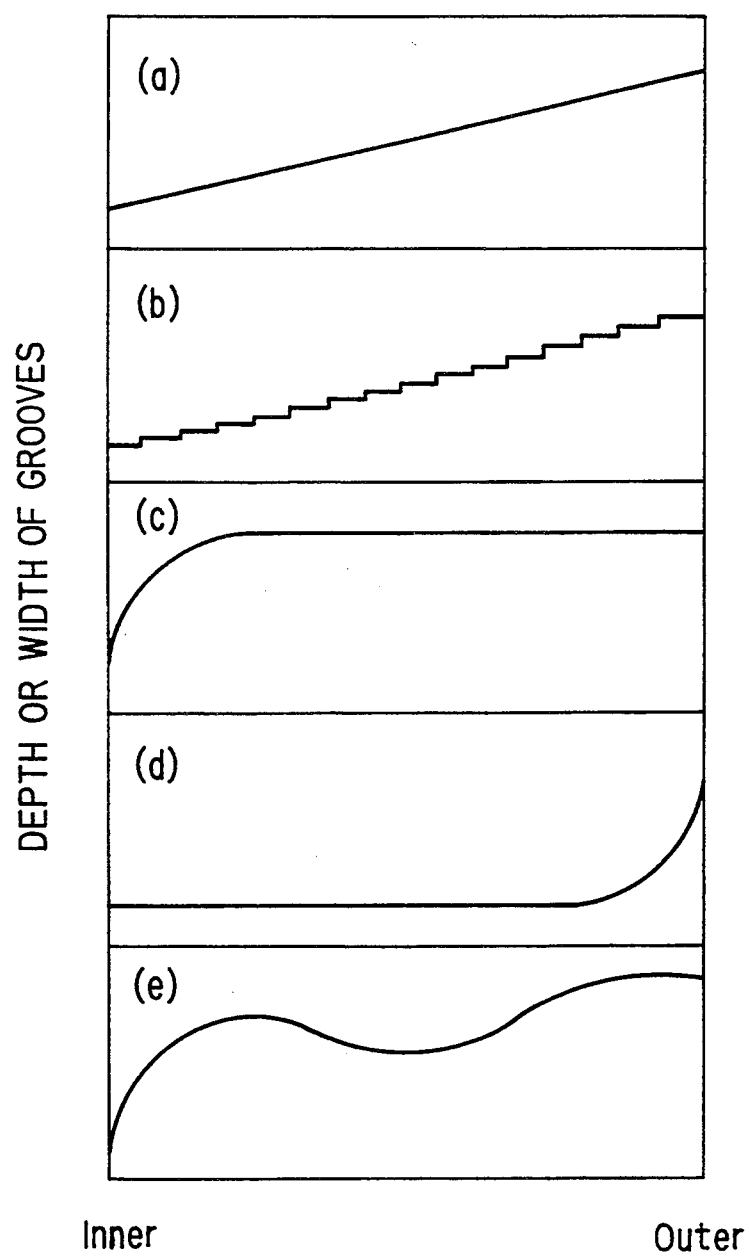
FIG. 1, (a), (b), (c), (d) and (e) show diagrammatically examples of the mode of varying demension of the groove according to the present invention.

As a substrate of the present invention, for example, a transparent injection moldable substrate, there may be used any material capable of transmitting substantially a semiconductor laser beam and usable for ordinary optical recording mediums.

Exemplary suitable materials for the substrate include polymers such as polycarbonate resins, acrylic resins, polystyrene resins, polyvinyl chloride resins, epoxy resins, polyester resins, amorphous polyolefin resins and the like, and inorganic materials such as glass and the like.

If necessary, these materials are formed into a substrate having a groove by means of injection molding or by a method using a photopolymer.

Among these resin substrates, from the standpoints of mechanical strength of substrate, easy formation of grooves and pits, injection molded resin substrates made of polycarbonate resins, acrylic resins, or polyolefin resins are preferable, and polycarbonate resin substrates are most preferable.

The shape of the substrate may be in the form of plate or film, or disc or card. The surface of the substrate is provided with at least a groove for controlling the recording position. The surface may have pits and the like for information.

Such grooves and pits are preferably formed when the substrate is fabricated by injection molding, compression molding or cast molding. However, grooves and pits may be produced by coating an ultraviolet ray curable resin on the substrate and a stamper is superposed thereon followed by irradiation with ultraviolet ray.

The depth of a groove of the substrate of the present invention is usually 500–2500 Å, and the width of the groove is usually 0.3–0.8 µm.

According to the present invention, the optical recording medium comprises a recording layer containing a dye, a reflective layer and a protective layer subsequently superposed on the substrate having a groove.

The dyes used in the recording layer may be dyes having absorption in the wavelength region of oscillation of semiconductor laser.

Exemplary suitable dyes include:
phthalocyanine dye,
naphthalocyanine dye,
porphyrin dye,
cyanine dye,
squarylium dye,
pyrylium dye,
thiopyrylium dye,
azulene dye,
naphthoquinone dye,
anthraquinone dye,
dithiol metal complex dye,
indophenol dye,
triphenylmethane dye,
xanthene dye,
indanthrene dye,
indigo dye,
merocyanine dye,
and azo dye.

These dyes may have various substituents so as to control the solubility of the dye in a solvent or obtain desirable recording characteristics. The dyes may be used alone or in combination.

Among the dyes, phthalocyanine dye, naphthalocyanine dye and porphyrin dye are preferable from the standpoints of light resistance and humidity and heat resistance. In particular, phthalocyanine dye is most preperaable from the standpoint of absorption characteristic of dye.

As phthalocyanine dyes there may be mentioned, for example,
alkyl substituted phthalocyanine,
alkoxy substituted phthalocyanine,
alkylthio substituted phthalocyanine,
trialkylsilyl sibstituted phthalocyanine,
halogenated phthalocyanine derived from the above-mentioned substituted phthalocyanine,
and the like.

More particular substituted phthalocyanine dyes as described in the above-mentioned EP - 0337209 and EP-0373643 are preferable which are incorprated by reference.

According to the present invention, the recording layer containing a dye can be usually formed by a coating method such as spin coating, dipping, bar coating and the like, because of easy film formation. Among them, a spin coating method is preferable.

Formation of a recording layer by a spin coating method may be carried out by dissolving the abovementioned dye in a solvent, dropping the resulting solution onto a substrate, rotating the substrate to spread the dye solution over the whole surface of the substrate and drying the spread solution.

Exemplary suitable solvents used for dissolving the dye include:

aliphatic hydrocarbon solvents such as
n-hexane,
n-octane,
isooctane,
cyclohexane,
methylcyclohexane,
ethylcyclohexane,
dimethylcyclohexane,
cyclooctane,
and the like;
ether solvents such as
diethylether,
diisopropyl ether,
dibutyl ether,
dioxane,
and the like;
alcohol solvents such as
methanol,
ethanol,
isopropyl alcohol,
butyl alcohol,
and the like;
cellosolve solvents such as
methyl cellosolve,
ethyl cellosolve,
and the like;
halogen containing solvents such as
carbon tetrachloride,
2,2,3,3-tetrafluoropropanol
and the like;
toluene,
xylene,
cyclohexanone,
methyl isobutyl ketone,
ethyl acetate,
butyl acetate,
and the like.

These organic solvents may be used alone or in combination.

When using such solvent, it is preferable to select a solvent which can dissolve a material (e.g. dye, resinous binder and additives) used for a recording layer and further, does not adversely affect the substrate. In general, the thickness of the recording layer is preferably about 500–2000 Å.

According to the present inventors' investigation, when the above-mentioned dye solution is coated on a substrate by a spin coating method to form a recording layer, the substrate is rotated to spread the dye solution over the whole surface of the substrate by means of centrifugal force.

The solution spreads by the centrifugal force from the inner peripheral portion to the outer peripheral portion of the substrate having a groove while the solvent evaporates. The cetrifugal force at the inner peripheral portion of the substrate is different from that at the outer peripheral portion. Therefore, there is a difference between the coating conditions at the inner peripheral portion and those at the outer peripheral portion.

Therefore, for example, when a substrate having a groove of a uniform shape, the thickness of the recording layer thus spread on a groove and a land is different from the inner peripheral portion toward the outer peripheral portion. Such phenomena do not occur in the case where the recording layer is formed by vapor deposition or sputtering.

Owing to the problems attributable to a spin coating method, various characteristics of the medium such as reflectivity, radial contrast signal, push-pull signal, recording sensitivity and the like are liable to become nonuniform, that is, vary from the inner peripheral portion to the outer peripheral portion.

It is demanded to suppress such nonuniformity of characteristics to within 15%. According to the study of the present inventors, the problems can be solved to some extent by selecting appropriately the type of solvent, dropping method of a dye solution and method of rotation, but have not yet been completely eliminated.

According to the present invention, in order to solve the problems, the dimension or shape of the groove of the substrate is changed gradually from the inner peripheral portion to the outer peripheral portion.

The difference in the shape of groove may be formed as to the depth, the width or both of them.

When the difference in the depth of groove is formed, the difference is usually 50–●Å, preferably 100–300 Å.

In the case of difference in the width, the difference is preferably 0.02–0.1 μm.

Naturally, when it is contemplated to vary the depth, the width is liable to change simultaneously, but as far as the difference in the width is within the above-mentioned range, there is no problem.

On the other hand, a difference in the width of groove can be formed without forming a difference in the depth. However, as far as the difference in the depth is within the above-mentioned range, the difference in the depth may be formed.

When the difference in the depth exceeds 500 Å or that in the width exceeds 0.1 μm, signal characteristics such as reflectivity, push-pull, radial contrast and the like and recording sensitivity are liable to become nonuniform, and therefore, it is preferable that the differences do not exceed such limits.

On the other hand, when the difference in the depth is less than 50 Å or that in the width is less than 0.02 μm, it is not always easy to control uniformly the above-mentioned signal characteristics, and further, fabrication of a substrate having such dimension is not so easy.

With respect to the depth, the manner of imparting the difference in the groove shape of a substrate is preferably to make the depth deeper from the inner peripheral portion to the outer peripheral portion.

With respect to the width, it is preferable to increase the width from the inner periphery to the outer peripheral portion.

The typical patterns of the variations are shown in FIG. 1. (a) shows a gradual (or linear) pattern, (b) shows a stepwise pattern, and (c)–(e) show some modifications or mixed modes thereof. Further, the (c)–(e) patterns may be changed to stepwise patterns along the continuous lines of (c)–(e) patterns. The numbers of steps are in the range of 2–512 (steps). There is a difference in the molding shrinkage of a resin between the inner peripheral portion and the outer peripheral portion by about 0.05% and therefore, it is advisable to take the difference into consideration.

In order to make the above-mentioned various characteristics of the medium uniform, it is easier to use a substrate having the difference in depth of groove than using a substrate having the difference in width of groove though it depends on the method of coating the dye solution.

The difference formed in the shape of groove is preferably gradual or stepwise from the inner peripheral portion to the outer peripheral portion.

According to the present invention, a difference in the shape of groove of the substrate from the inner peripheral portion to the outer peripheral portion can be formed by molding the substrate using a stamper having a groove with a difference in shape.

Such stamper may be fabricated by using a photoresist having a film thickness varying from the inner peripheral portion to the outer peripheral portion, or by varying the laser beam power irradiating the resist from the inner peripheral portion to the outer peripheral portion.

For example, the thicker the resist film, or the higher the laser beam power, the deeper the depth of groove of the substrate can be. On the other hand, the width of groove of the substrate can be widened by increasing the power of laser beam upon exposure.

Further, the groove shape of the substrate of the present invention can be fabricated by selecting appropriately the molding conditions of the substrate so as to change the transferring rate of groove shape of a stamper from the inner peripheral portion to the outer peripheral portion.

Further, the groove shape may be decreased from the inner side to the outer side depending on the coating conditions. In such a case, the pattern is an inverse pattern of FIG. 1.

Various patterns may be produced by using, for example, a plurality of nozzles are used for coating, and changing the dropping amounts of the dye solution of the nozzles from one another.

When a recording layer containing a dye is prepared, in addition to the above-mentioned dye, there may be used resinous binders such as nitrocellulose, ethylcellulose, acrylic resins, polystyrene resins, urethane resins and the like, and additives such as leveling agents, defoaming agent, coupling agent and the like.

When large amounts of the binder and the additive are added, the recording sensitivity and reflectivity are lowered.

In view of such fact as above, the amount of the binder and the additive is usually less than 20% by weight, preferably 10% by weight or less, more preferably 5% by weight or less.

In other words, the amount of the above-mentioned dye in the recording layer is usually at least 80% by weight, preferably 90–100% by weight, more preferably 95–100% by weight.

In order to improve the resistance to a coating solvent and recording characteristics and prevent deterioration of the recording layer, there may be formed an intermediate layer between the substrate and the recording layer.

Exemplary suitable materials for the intermediate layer include high polymers such as polycarbonate resins, acrylic resins, polyurethane resin, epoxy resins, phenolic resins, ultraviolet ray curable resins and the like, and inorganic substances such as silicon oxide, aluminum oxide, silicon nitride, aluminum nitride and the like. The intermediate layer may be a single layer or a multi-layer.

According to the present invention, a reflective layer is formed on a recroding layer. A material for forming the reflective layer is preferably that having a sufficiently high reflectivity to a semiconductor laser beam, and for example, there is used a thin film of a metal such as Au, Ag, Al, Cu, Cr, Ni, Pt and the like and a thin film of an alloy containing the metal as main component.

Further, there may be used a multi-layer film produced by laminating alternatively a low refractive index material layer and a high refractive index material layer.

Among the above-mentioned materials, Au, Al and the like or films containing such metal as a main component are preferable since such material can give a high reflectivity and the film formation is easy.

These reflective films can be formed by sputtering, vapor deposition, ion plating or the like. The thickness of the reflective layer is preferably about 500–2000 Å.

In order to improve adhesion and recording characteristics and enhance reflectivity, there may be provided an intermediate layer between the recording layer and the reflective layer.

As materials for this intermediate layer, there may be used the above-mentioned materials used for the intermediate layer between the substrate and the recording layer, silane coupling agent, titanate type coupling agent and the like.

According to the present invention, there is provided a protective layer on the reflective layer so as to protect the recording layer and the reflective layer.

The protective layer may be usually made of a high polymer such as polycarbonate resins, acrylic resins, epoxy resins, urethane resins, polyester resins, polysiloxane resins, silicone resins and the like or an inorganic substance such as silicone oxide, aluminum oxide, silicon nitride, aluminum nitride and the like.

Among them, ultraviolet ray-curable acrylic resins and epoxy resins are preferable since these materials can be easily formed into a film.

The above-mentioned materials may be used alone or in combination. The protective layer may be formed of a single layer or laminated two or more layers. The thickness of the protective layer is preferably about 2–15 μm.

The optical recording medium of the present invention is irradiated with a laser beam through the substrate to record signals or read out the information. Wavelength of the laser beam is preferably 640–860 nm. Semiconductor laser having an oscillatory wavelength of such range as above is preferably used. For recording, the laser output is made about 5–15 mW on the recording film while rotating the medium, and for readout, the laser output is made about 1/10 times that for recording.

Printing may be made on the protective layer of the optical recording medium of the present invention.

The optical recording medium of the present invention can record a large volume of information and is playable by commercially available compact disc players.

Particularly, the optical recording medium has uniform characteristics over the whole surface of the medium, and the characteristics are at least one of reflectivity, radial contrast signal and push-pull signal.

The present invention is explained more in detail in the following examples, but the embodiments of the present invention is not limited thereto.

EXAMPLE 1

A 5 wt. % solution of a brominated (average 3.6 atoms per molecule) Pd-tetra-(1,2-dimethylpropoxy)-phthalocyanine in dibutyl ether was dropped on the inner peripheral portion of an injection molded polycarbonate resin substrate of 1.2 mm thick and 120 mm in diameter, having a spiral groove (0.48 μm in width, 1530 Å in depth at the inner peripheral portion and 0.50 μm in width, 1730 Å in depth at the outer peripheral portion, the difference being present in depth at 100 steps; 1.6 μm in pitch). Then the resin substrate was rotated at a speed of 900 rpm for 30 sec. The resin substrate was dried at 40° C. for 1 hour in vacuo and a recording layer substantially composed of a phthalocyanine dye was formed on a resin substrate.

On the recording layer was formed a gold thin film of 80 nm thick as a reflective layer by means of sputtering, and further, as a protective layer, an ultraviolet ray-cured resin layer of 5 μm thick was formed on a reflective layer to produce an optical recording medium.

While the resulting optical recording medium was rotated at a linear speed of 1.4 m/s, there was used an optical disc recording apparatus provided with an optical head carrying a semiconductor laser having an oscillation wavelength of 780 nm and a laser beam was controlled such that the laser beam focused on the recording layer through the resin substrate. Thus there were measured reflectivity (Rg) on the groove and radial contrast signal (RCb) at the unrecorded portion with a laser output of 1 mW on the recording surface.

Then, the laser output was changed to 7 mW to record an EFM modulation signal in the groove and the laser output was changed again to 1 mW to determine the maximum reflectivity (R top) and push-pull signal (P/Pa) at the recorded portion.

These procedures were effected at the inner peripheral portion (23 mm φ), the middle circlar portion (32 mm φ) and the outer peripheral portion (57 mm φ).

The results are shown in Table 1.

In the following examples and comparative examples, similar evaluation procedures were conducted.

EXAMPLE 2

The procedure of Example 1 was repeated except that the depth of groove of the substrate varied from 1550 Å at the inner peripheral portion to 1680 Å at 32 mm in radius at 20 steps and is 1700 Å from 32 mm in radius to the outer peripheral portion and the rotation upon coating the dye solution was 1200 rpm, and a medium was prepared and evaluated. Table 1 shows the result.

EXAMPLE 3

The procedure of Example 1 was repeated except that in the substrate the depth of groove was 1400 Å and the width of groove varied from 0.46 μm at the inner peripheral portion to 0.53 μm at the outer peripheral portion at 100 steps and the rotation upon coating the dye solution was 1000 rpm, and a medium was prepared and evaluated. Table 1 shows the result.

EXAMPLE 4

The procedure of Example 1 was repeated except that in the substrate the depth and width of groove were varied from 1200 Å, 0.51 μm at the inner peripheral portion to 1500 Å, 0.51 μm at the outer peripheral portion at 100 steps and the rotation upon coating the dye solution was 1200 rpm, and a medium was prepared and evaluated. The result is shown in Table 1.

EXAMPLE 5

The procedure of Example 1 was repeated except that the depth and width of groove of the substrate varied from 1400 Å, 0.45 μm at the inner peripheral portion to 2000 Å, 0.47 μm at the outer peripheral portion at 100 steps, and a medium was prepared and evaluated. The result is shown in Table 1.

Comparative Example 1

The procedure of Example 1 was repeated except that the width of groove was 0.51 μm and the depth of groove of the substrate was 1250 Å at the inner peripheral portion and 1280 Å at the outer peripheral portion, that is, there is substantially no difference in depth of groove between the inner and the outer peripheral portions, and a medium was prepared and evaluated. The result is shown in Table 1.

EXAMPLE 6

The procedure of Example 3 was repeated except that the depth of groove was 1500 Å and the width of groove of the substrate varied from 0.44 μm at the inner peripheral portion to 0.60 μm at the outer peripheral portion, at 100 steps, and a medium was prepared and evaluated. The result is shown in Table 1.

TABLE 1

|  |  |  | Examples of the present invention | | | | | | Comparative |
|---|---|---|---|---|---|---|---|---|---|
|  |  |  | 1 | 2 | 3 | 4 | 5 | 6 | Example 1 |
| Inner | Unrecorded | Rg(%) | 70.8 | 70.7 | 72.0 | 70.7 | 71.3 | 69.8 | 67.5 |
| peripheral | portion | RCb(%) | 0.092 | 0.090 | 0.057 | 0.055 | 0.064 | 0.055 | 0.052 |
| portion | Recorded | Rtop(%) | 67.8 | 67.3 | 69.5 | 67.3 | 68.1 | 66.5 | 64.2 |
| (23 mm in radius) | portion | P/Pa(%) | 0.078 | 0.080 | 0.069 | 0.075 | 0.080 | 0.085 | 0.072 |
| Middle | Unrecorded | Rg(%) | 71.3 | 72.0 | 71.5 | 69.5 | 67.8 | 70.2 | 70.1 |
| circular | portion | RCb(%) | 0.088 | 0.091 | 0.055 | 0.054 | 0.082 | 0.057 | 0.030 |
| portion | Recorded | Rtop(%) | 68.1 | 68.7 | 68.8 | 66.9 | 65.1 | 67.0 | 66.8 |
| (32 mm in radius) | portion | P/Pa(%) | 0.077 | 0.081 | 0.072 | 0.077 | 0.100 | 0.068 | 0.078 |
| Outer | Unrecorded | Rg(%) | 71.6 | 72.5 | 72.5 | 70.5 | 63.8 | 70.5 | 71.5 |
| peripheral | portion | RCb(%) | 0.083 | 0.080 | 0.051 | 0.051 | 0.112 | 0.065 | 0.020 |
| portion | Recorded | Rtop(%) | 69.5 | 68.9 | 69.6 | 67.3 | 61.2 | 67.4 | 68.5 |
| (57 mm in radius) | portion | P/Pa(%) | 0.072 | 0.085 | 0.075 | 0.080 | 0.115 | 0.055 | 0.082 |

Rg: Reflectivity of groove at unrecorded portion
RCb: Radial contrast signal at unreacted portion
Rtop: Maximum reflectivity at recorded portion
P/Pa: Push-pull signal at recorded portion

What is claimed is:

1. An optical recording medium of a single plate type comprising a substrate having a groove, a recording layer containing a dye overlying the substrate, a reflective layer overlying the recording layer, and a protective layer overlying the reflective layer, wherein the recording layer is formed by a spin-coating method, and the depth of the groove at the center portion of the substrate differs by 50–•Å from its depth at the outer periphery of the substrate.

2. An optical recording medium according to claim 1, wherein the difference in the depth is 100–300 Å.

3. An optical recording medium according to claim 2, wherein the width of the groove at the center portion of the substrate differs by 0.05–0.1 μm from its width at the outer periphery of the substrate.

4. An optical recording medium according to claim 1, wherein the width of the groove at from the center portion of the substrate differs by 0.05–0.1 μm from its width at the outer periphery of the substrate.

5. An optical recording medium according to claim 1, in which the dye is a phthalocyanine-type dye.

6. An optical recording medium of a single plate type comprising a substrate having a groove, a recording layer containing a dye overlying the substrate, a reflective layer overlying the recording layer, and a protective layer overlying the reflective layer, wherein the recording layer is formed by a spin-coating method, and the width of the groove at the center portion of the substrate differs by 0.05–0.1 μm from its width at the outer periphery of the substrate.

7. An optical recording medium according to claim 6, in which the dye is a phthalocyanine-type dye.

8. A substrate for an optical recording medium of a single plate type adapted to support a recording layer containing a dye, a reflective layer overlying the recording layer, and a protective layer overlying the reflective layer, wherein the recording layer is formed by a spin-coating method, said substrate having a groove whose depth at the center portion of the substrate differs by 50–•Å from its depth at the outer periphery of the substrate, and/or whose width at the center portion of the substrate differs by 0.05–0.1 μm from its width at the outer periphery of the substrate.

9. A substrate according to claim 8, wherein the difference in depth is 100–300 Å.

10. A stamper having a groove for forming the substrate of claim 8, wherein the depth of the groove at center portion of the substrate differs by 50–•Å from the depth thereof at the outer periphery of the substrate and/or the width of the groove at the center portion of the substrate differs by 0.05–0.1 μm from the width thereof at the outer periphery of the substrate.

* * * * *

UNITED STATES PATENT AND TRADEMARK OFFICE
CERTIFICATE OF CORRECTION

PATENT NO. : 5,344,682
DATED : September 6, 1994
INVENTOR(S) : Tadahiko MIZUKUKI et al.

It is certified that error appears in the above-indentified patent and that said Letters Patent is hereby corrected as shown below:

In Claim 1, Column 10, Line 1: Change 50-•Å to read -- 50-500Å --.

In Claim 8, Column 10, Line 33: Change 50-•Å to read -- 50-500Å --.

In Claim 10, Column 10, Line 59: Change 50-•Å to read -- 50-500Å --.

Signed and Sealed this

Sixth Day of December, 1994

Attest:

BRUCE LEHMAN

*Attesting Officer*   *Commissioner of Patents and Trademarks*